July 2, 1963  E. R. J. CUSDEN  3,095,584
HONEYCOMB UNCAPPING MACHINE
Filed May 19, 1961  3 Sheets-Sheet 1

INVENTOR.
EARL R. J. CUSDEN,
BY
McMorrow, Berman & Davidson
ATTORNEYS.

July 2, 1963 E. R. J. CUSDEN 3,095,584
HONEYCOMB UNCAPPING MACHINE
Filed May 19, 1961 3 Sheets-Sheet 2

INVENTOR.
EARL R. J. CUSDEN,
BY
McMorrow, Berman & Davidson
ATTORNEYS.

INVENTOR.
EARL R. J. CUSDEN,
BY
McMorrow, Berman & Davidson
ATTORNEYS.

United States Patent Office 3,095,584
Patented July 2, 1963

3,095,584
HONEYCOMB UNCAPPING MACHINE
Earl R. J. Cusden, Dearborn, Mich.
(8251 Bryce Road, Goodells, Mich.)
Filed May 19, 1961, Ser. No. 111,202
8 Claims. (Cl. 6—12)

This invention relates to a novel and improved honeycomb uncapping machine.

The primary object of the invention is the provision of an efficient, practical, and easily operated machine of the kind indicated, which, while primarily intended to be operated manually, can be readily adapted for power operation.

Another object of the invention is the provision of a simpler and less costly machine of the character indicated above, which is composed of a small number of uncomplex parts, which are easily manufactured and assembled.

A further object of the invention is the provision of a machine of the character indicated above wherein honeycombs to be uncapped are placed upon a stationary base, and laterally spaced, horizontally elongated knives are moved vertically, relative to the base for shearing wax from the opposite sides of honeycombs, provision being made for automatic spreading of the knives away from each other, and hence away from the sides of a honeycomb or honeycombs, on completion of a downstroke of the knives, whereby free flow of honey from the cells of honeycomb uncapped by the knives, is provided for.

Other important objects and advantageous features of the invention will be apparent from the following description and the accompanying drawings, wherein, for purposes of illustration only, a specific form of the invention is set forth in detail.

Figure 1:
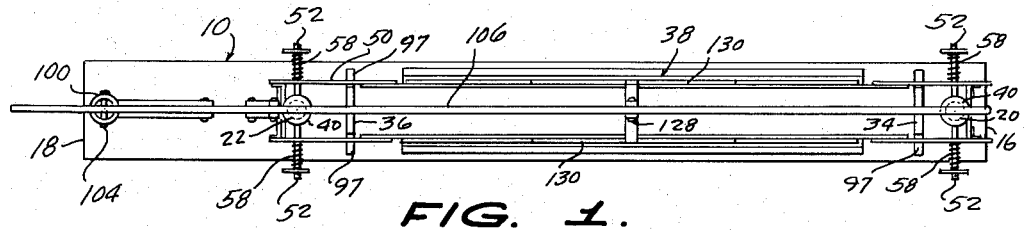
FIGURE 1 is a top plan view of a machine of the present invention.
Figure 2:
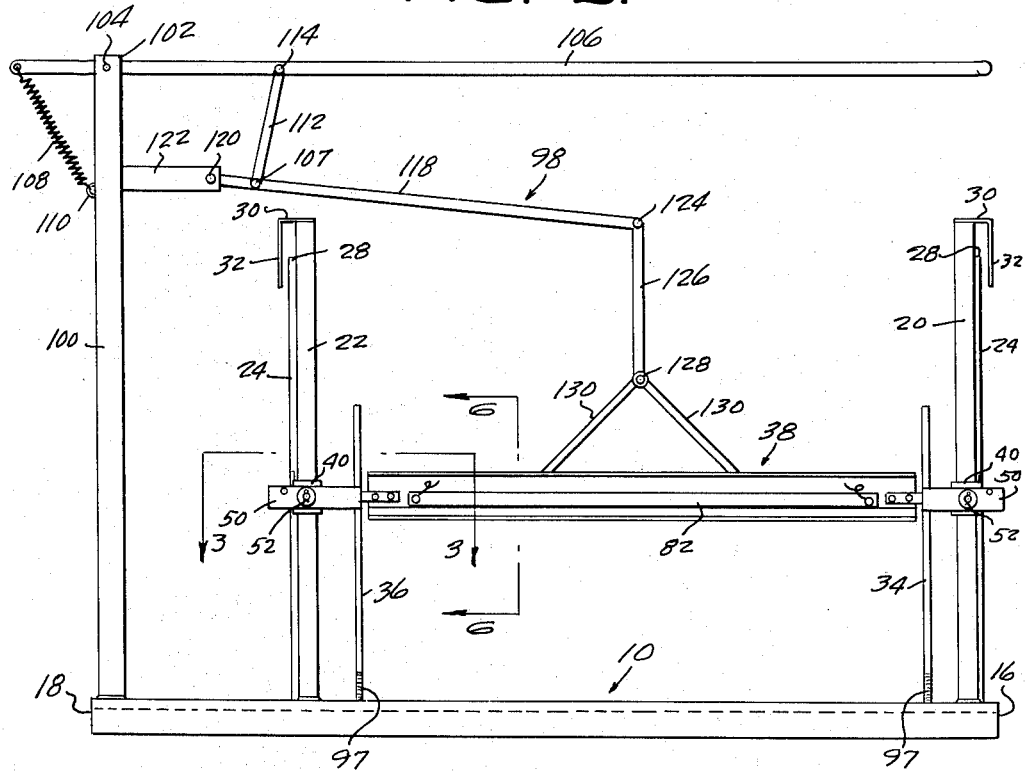
FIGURE 2 is a side elevation thereof, showing the knives in an intermediate elevated position.

Referring in detail to the drawings, wherein like numerals designate like parts throughout the several views, the illustrated machine comprises an elongated flat base 10 having a horizontal top wall 12, and adapted to be supported on a suitable surface, as by means of side flanges 14, and/or legs (not shown). The base 10 has first and second or forward and rear ends 16 and 18, respectively, and cylindrical, and preferably tubular, perpendicular posts 20 and 22, which are similarly fixed to and rise from the base top wall 12, at the forward end thereof, and at a point near to and spaced from the rear end of the base 10, respectively.

The posts 20 and 22 have, on their remote sides, similar vertically elongated, diametrically disposed guide flanges 24, which extend upwardly from the base top wall 12, and upper ends 28, which are spaced downwardly, at similar distances, from the upper ends of the posts. Stops are provided at the upper ends of the posts, which are similar and comprise horizontal portions 30, fixed upon the upper ends of the posts, and pendant vertical portions 32, which are positioned at the same sides of the posts as the guide flanges 24, and are parallelly spaced outwardly relative to these flanges.

At the inward or facing sides of the posts 20, 22 similar perpendicular knife guide bars 34 and 36 are fixed to and rise from the base top wall 12, to levels about the mid-height of the posts. The guide bars 34, 36 are flat and are disposed with their widths extending crosswise and at right angles to the base 10, and are spaced at similar distances from the posts.

Figure 3:
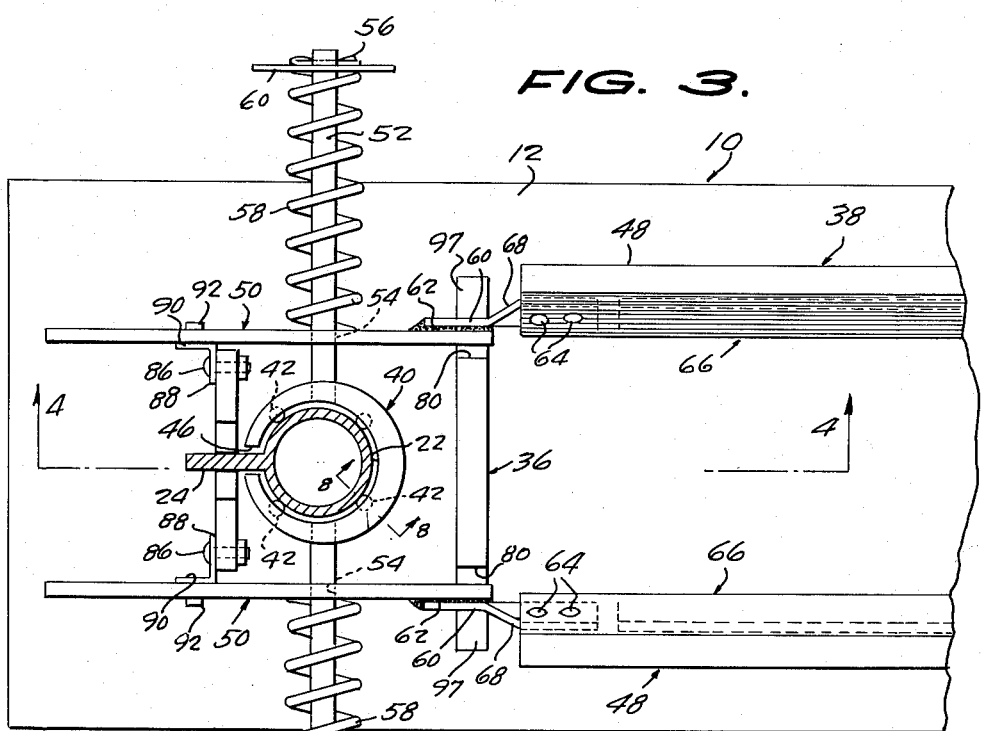
FIGURE 3 is an enlarged fragmentary horizontal section taken on the line 3—3 of FIGURE 2.
Figure 8:
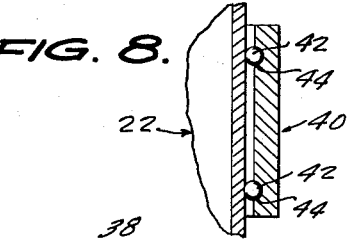
FIGURE 8 is a fragmentary vertical transverse section taken on the line 8—8 of FIGURE 3.

A knife assembly 38 is positioned between the posts 20, 22 and is operatively related thereto and to the guide bars 34, and 36. The blade assembly 38 comprises split sleeves 40, which are larger in diameter than, and are loosely circumposed on the posts, as shown in FIGURES 3 and 8, and suitable bearing means, such as circumferentially and vertically spaced ball bearings 42 are engaged in sockets 44 in the inner surfaces of the sleeve and bear against the posts. The guide flanges 24 of the posts extend freely and outwardly through the splits 46 of the sleeves 40.

The knife assembly 38 further comprises a pair of similar parallel and coextensive knife members 48 which comprise pairs of horizontally elongated, vertically disposed blade carrier plates 50, at each end of the assembly, which extend beyond the end sides of the posts 20, 22 and are spaced from the lateral sides of the posts. Aligned diametrical rods 52 are fixed to and reach horizontally and outwardly from the opposite lateral sides of the posts, and the carrier plates 50 have centered holes 54, intermediate their ends, which slidably receive the rods 50, and have stop means, such as cotter pins 56, on their outer ends. Helical springs 58 are circumposed on the rods 52, and are compressed between related sides of the posts 20, 22 and washers 60, circumposed on the rods 52 and retained by the cotter pins 56.

Figure 4:
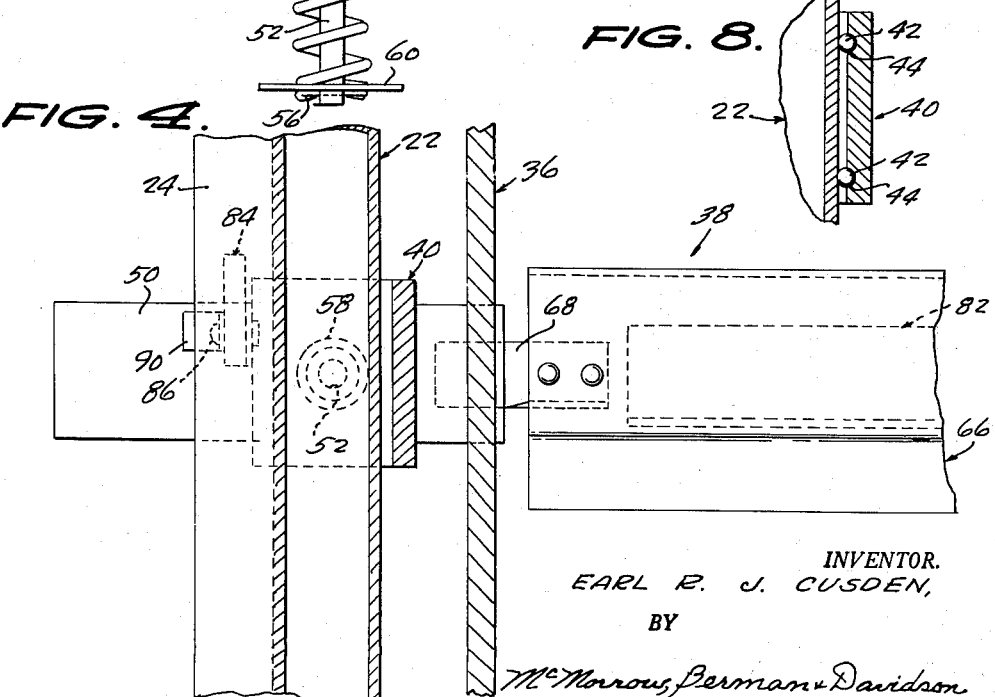
FIGURE 4 is a fragmentary vertical longitudinal section taken on the line 4—4 of FIGURE 3.
Figure 6:
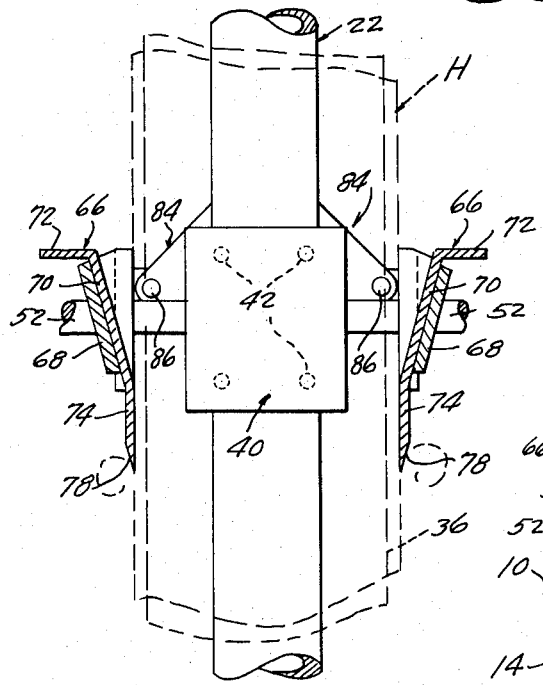
FIGURE 6 is an enlarged fragmentary vertical transverse section taken on the line 6—6 of FIGURE 2, showing the knives in unspread position and in shearing relation to the opposite sides of a honeycomb, shown in phantom lines.

Knife attaching straps 60, suitably secured, as indicated at 62, to the outer sides of the carrier plates 50, extend inwardly therefrom, and are suitably secured, as indicated at 64, to the outer sides of knife elements 66. As shown in FIGURES 3 and 6, end portions 68 of the straps 60 are angled laterally outwardly and upwardly relative to the carrier plates 50, so as to bear conformably against the outer sides of laterally outwardly and upwardly angled upper portions 70 of the knife elements 66. The knife elements 66 have laterally outwardly extending stiffening flanges 72 on and extending along the upper edges of their canted upper portions 70, and perpendicular lower portions 74 extend downwardly from the lower edges of the upper portions 70, as shown in FIGURE 6, and have sharp edges 76 extending along the lower edges thereof, which are defined by bevelling the outer sides of the lower portions, as indicated at 78 to the inner sides thereof. As shown in FIGURES 3 and 4 the base mounted guide bars 34, 36, are centered between the carrier plates 50, at their inner ends, and the edges 80 of the guide bars are spaced from the inner surfaces of the carrier plates, in the spread condition of the carrier plates and hence of the knife elements 66, as shown in FIGURE 3. The knife elements 66 have preferably electrically heated heating elements 82 suitably secured to the outer sides of the upper portions 70 of the knife elements.

Figure 5:
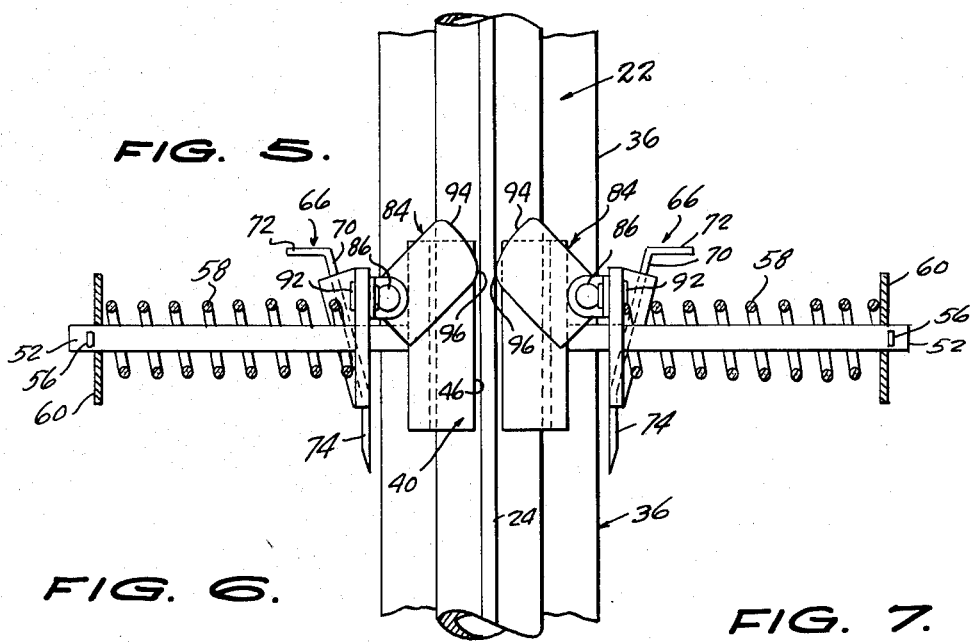
FIGURE 5 is an enlarged end elevation, partly in section, showing the knife-positioning dogs engaged with a guide flange, and the knives in unspread condition.
Figure 7:
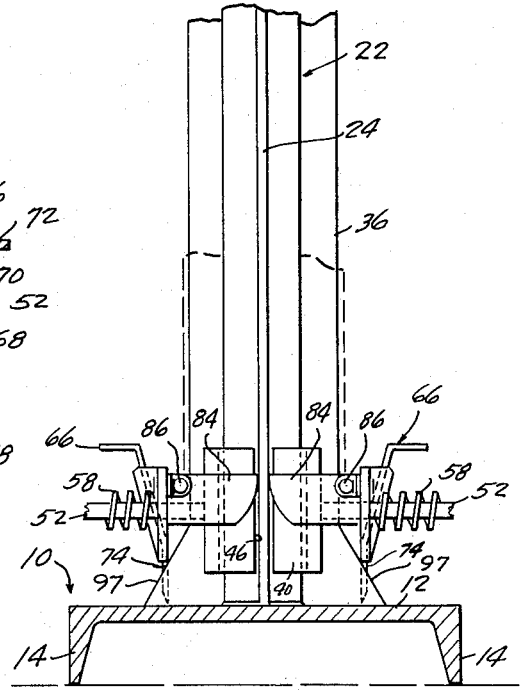
FIGURE 7 is an enlarged and fragmentary end elevation, similar to FIGURE 5, showing the knife assembly in depressed position and showing the knives in unspread condition in full lines and in spread condition in phantom lines.

Spreading of the carrier plates 50 is produced by dogs 84 which are of generally rectangular shape, and are pivoted, at the upper corners of their outer ends, as indicated at 86, to the inwardly extending ears 88, of L-shaped brackets 90, which are suitably fixed, as indicated at 92, to the inward sides of the carrier plates in alignment with the guide flanges 24 of the posts 20, 22, as shown in FIGURES 3, 4 and 5. The dogs 84 have inner ends, which are in the form of convexly curved cam edges 94 which have rounded lower ends 96, to bear against the opposite sides of the guide flanges 24. The dogs 84 are of sufficient mass that they are downwardly urged, by gravity, into engagement with the sides of the guide flanges 24, wherein the springs 58 are compressed and under tension, and the knife elements 66 are in unspread or contracted condition. As a result of this arrangement, when the knife assembly 38 is depressed to its lowest position, close to contact of the knife elements 66 with the base top wall 12, as shown in FIGURE 7, and the knife assembly starts upwardly, the inner ends of the dogs 84 remain in engagement with the guide flanges 24 and the dogs swing further downwardly, whereby the blade elements 66 are forced outwardly away from each other or spread, against the resistance of the springs 58, so that the knife elements 66 which were in shearing relationship to the sides of a honeycomb H resting upon the base 10, are moved outwardly away from the sides of the honeycomb, so as to provide for free flow of honey from the uncapped sides of the honeycomb. The opposite edges of the knife guide bars 34, 36 have, at the lower end thereof, laterally outwardly and downwardly angled cam surfaces 97, which are engaged by the blade carrier plates 50, so as to assure adequate spreading of the blades away from each other as they reach their lowermost position, so that the dogs 84 can fall to horizontal position and engage the guide 24, as shown in FIGURE 7.

Elevation and depression of the knife assembly 38, relative to the base 10, is produced by an operating assembly 98 which comprises a standard 100 which is fixed to and rises from the base plate top wall 12, at the second or rear end of the base and has a clevis 102, on its upper end, in which is pivoted, as indicated at 104, adjacent its rear end, a generally horizontal handle lever 106. A retracting spring 108 is stretched between the rear end of the handle lever 106 and an eye 110 on the standard 100. A pendant link 112 is pivoted, at its upper end, as indicated at 114, to a part of the handle lever near the standard 100, and is pivoted, at its lower end, as indicated at 107, to an intermediate part of a generally horizontal lever 118, which is pivoted, at its rear end, as indicated at 120, to a fixed horizontal bracket 122, which reaches forwardly from the standard 100. The forward end of the lever 118 is pivoted, as indicated at 124, to the upper end of a vertical link 126, whose lower end is pivoted, as indicated at 128 to the upper ends of pairs of upwardly convergent arms 130. The pairs of arms 130 are flexible to provide for spreading and contracting of the knife elements 66, away from and toward each other, in the manner described hereinabove, and are suitably fixed, at their lower ends, to intermediate portions of the blade elements 66. With this arrangement, manually depressing the handle lever 106, from its elevated, spring-retracted position, depresses the knife assembly 38 along the posts 20, 22, for uncapping the sides of a honeycomb resting upon the base 10, and release of the handle lever 106, from a depressed position, frees the spring 108 to elevate the handle lever and the knife assembly 38. Elevation of the knife assembly 38 is arrested by engagement of the sleeves 40 with the horizontal portions 30 of the stops on the upper ends of the posts 20, 22.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A honeycomb uncapping machine comprising an elongated honeycomb supporting base having first and second ends, longitudinally spaced first and second posts fixed to and rising from the base, a horizontally elongated knife assembly extending between and mounted for vertical movement on the posts, and an operating assembly mounted on the base and operatively connected to the knife assembly, said knife assembly comprising a pair of coextensive, laterally spaced knife elements, said knife elements being movably related to each other to assume spread and contracted relationships, and means mounted on the knife assembly and coacting with portions on the posts for spreading and contracting the knife elements, said means comprising vertical guide flanges on the posts having lower ends spaced above the base, and laterally inwardly spring-pressed dogs individually mounted on knife elements and engaged with opposite sides of the guide flanges for contracting the knife elements, the dogs being adapted to move downwardly in contact with the guide flanges as the knife assembly rises from a fully depressed position of the knife assembly whereby the knife elements are spread away from each other.

2. A honeycomb uncapping machine comprising an elongated honeycomb supporting base having first and second ends, longitudinally spaced first and second posts fixed to and rising from the base, a horizontally elongated knife assembly extending between and mounted for vertical movement on the posts, and an operating assembly mounted on the base and operatively connected to the knife assembly, said knife assembly comprising a pair of coextensive, laterally spaced knife elements, and split sleeves slidably circumposed on the posts, said posts having vertical guide flanges extending therealong, the sleeves having splits receiving the guide flanges, said sleeves having diametrically opposed rods extending outwardly therefrom, carrier plates disposed at opposite sides of the posts and slidably mounted on the rods, said rods having stops at their outer ends, coil springs circumposed on the rods and compressed between the stops and the sides of the posts, said knife elements being secured at their ends to the carrier plates, dogs having outer ends pivoted on the carrier plates, and cams on their inner ends, the dogs being gravity depressed into engagement with the opposite sides of the guide flanges for contracting the knife elements toward each other while the dogs are engaged with the guide flanges, the cams of the dogs then assuming depressed engagements with the guide flanges for spreading the knife elements away from each other against the resistance of the springs, as the knife assembly is elevated from its depressed position.

3. A honeycomb uncapping machine comprising an elongated honeycomb supporting base having first and second ends, longitudinally spaced first and second posts fixed to and rising from the base, a horizontally elongated knife assembly extending between and mounted for vertical movement on the posts, and an operating assembly mounted on the base and operatively connected to the knife assembly, said knife assembly comprising a pair of coextensive, laterally spaced knife elements, said knife elements being movably related to each other to assume spread and contracted relationships, and means mounted on the knife assembly and coacting with portions on the posts for spreading and contracting the knife elements, said means comprising vertical guide flanges on the posts having lower ends spaced above the base, and laterally inwardly spring-pressed dogs individually mounted on knife elements and engaged with opposite sides of the guide flanges for contracting the knife elements, the dogs being adapted to move downwardly in contact with the guide flanges as the knife assembly rises from a fully depressed position of the knife assembly whereby the knife elements are spread away from each other, said knife elements having upwardly divergent upper portions and perpendicular lower portions having sharp lower edges.

4. A honeycomb uncapping machine comprising an elongated honeycomb supporting base having first and second ends, longitudinally spaced first and second posts fixed to and rising from the base, a horizontally elongated knife assembly extending between and slidably mounted for vertical movement on the posts, and an operating assembly mounted on the base longitudinally outwardly of a post and operatively connected to the knife assembly, said knife assembly comprising a pair of coextensive, laterally spaced knife elements, said operating means comprising a standard fixed to and rising from the base, a normally horizontal handle lever pivoted intermediate its ends on said standard on a level above the posts, flexible arm means individually fixed to and rising from the knife elements, and link and lever means operatively connected to the handle lever and said arm means.

5. A honeycomb uncapping machine comprising an elongated honeycomb supporting base having first and second ends, longitudinally spaced first and second posts fixed to and rising from the base, a horizontally elongated knife assembly extending between and slidably mounted for vertical movement on the posts, and an operating assembly mounted on the base longitudinally outwardly of a post and operatively connected to the knife assembly, said knife assembly comprising a pair of coextensive, laterally spaced knife elements, said operating means comprising a standard fixed to and rising from the base, a normally horizontal handle lever pivoted intermediate its ends on said standard on a level above the posts, flexible arm means individually fixed to and rising from the knife elements, and link and lever means operatively connected to the handle lever and said arm means, said standard being located on the base in line with and longitudinally outward of a post, said handle lever extending toward the other post.

6. A honeycomb uncapping machine comprising an elongated honeycomb supporting base having first and second ends, longitudinally spaced first and second posts fixed to and rising from the base, a horizontally elongated knife assembly extending between and slidably mounted for vertical movement on the posts, and an operating assembly mounted on the base longitudinally outwardly of a post and operatively connected to the knife assembly, said knife assembly comprising a pair of coextensive, laterally spaced knife elements, said operating means comprising a standard fixed to and rising from the base, a normally horizontal handle lever pivoted intermediate its ends on said standard on a level above the posts, flexible arm means individually fixed to and rising from the knife elements, and link and lever means operatively connected to the handle lever and said arm means, said standard being located on the base in line with and longitudinally outward of a post, said handle lever extending toward the other post, and being centered over the knife assembly.

7. A honeycomb uncapping machine comprising an elongated honeycomb supporting base having first and second ends, longitudinally spaced first and second posts fixed to and rising from the base, a horizontally elongated knife assembly extending between and mounted for vertical movement on the posts, and an operating assembly mounted on the base and operatively connected to the knife assembly, said knife assembly comprising a pair of coextensive, laterally spaced knife elements, said knife elements being movably related to each other to assume spread and contracted relationships, and means mounted on the knife assembly and coacting with portions on the posts for spreading and contracting the knife elements, said means comprising vertical guide flanges on the posts having lower ends spaced above the base, and laterally inwardly spring-pressed dogs individually mounted on knife elements and engaged with opposite sides of the guide flanges for contracting the knife elements, the dogs being adapted to move downwardly in contact with the guide flanges as the knife assembly rises from a fully depressed position of the knife assembly whereby the knife elements are spread away from each other, and vertical knife guide bars fixed to and rising from the base and spaced inwardly from the posts and rising between the knife elements.

8. A honeycomb uncapping machine comprising an elongated honeycomb supporting base having first and second ends, longitudinally spaced first and second posts fixed to and rising from the base, a horizontally elongated knife assembly extending between and mounted for vertical movement on the posts, and an operating assembly mounted on the base and operatively connected to the knife assembly, said knife assembly comprising a pair of coextensive, laterally spaced knife elements, said knife elements being movably related to each other to assume spread and contracted relationships, and means mounted on the knife assembly and coacting with ports on the posts for spreading and contracting the knife elements, said means comprising vertical guide flanges on the posts having lower ends spaced above the base, and laterally inwardly spring-pressed dogs individually mounted on knife elements and engaged with opposite sides of the guide flanges for contracting the knife elements, the dogs being adapted to move downwardly in contact with the guide flanges as the knife assembly rises from a fully depressed position of the knife assembly whereby the knife elements are spread away from each other, and vertical knife guide bars fixed to and rising from the base and spaced inwardly from the ports and rising between the knife elements, said guide bars having side edges engageable by the knife elements, said side edges having laterally outwardly and downwardly angled cam surfaces at their lower ends for spreading the knife elements far enough away from the guide flanges to enable the dogs to fall to engagements with the opposite sides of the guide flanges.

References Cited in the file of this patent

UNITED STATES PATENTS

| 261,329 | Flanagan | July 18, 1882 |
| 387,126 | Vermilion | July 31, 1888 |
| 1,040,582 | Royer et al. | Oct. 8, 1912 |
| 1,084,141 | Ferguson | Jan. 13, 1914 |

FOREIGN PATENTS

| 10,314 | Great Britain | 1886 |